(12) United States Patent
Shur et al.

(10) Patent No.: US 12,298,606 B2
(45) Date of Patent: May 13, 2025

(54) ASPHERICAL OPHTHALMIC LENS

(71) Applicant: SHAMIR OPTICAL INDUSTRY LTD., Upper Galilee (IL)

(72) Inventors: Alexander Shur, Haifa (IL); Dagan Avishai, Kibbutz Shamir (IL); Noam Baran, Kibbutz Shamir (IL)

(73) Assignee: SHAMIR OPTICAL INDUSTRY LTD., Upper Galilee (IL)

( * ) Notice: Subject to any disclaimer, the term of this patent is extended or adjusted under 35 U.S.C. 154(b) by 1087 days.

(21) Appl. No.: 17/262,927

(22) PCT Filed: Jul. 22, 2019

(86) PCT No.: PCT/IL2019/050820
§ 371 (c)(1),
(2) Date: Jan. 25, 2021

(87) PCT Pub. No.: WO2020/021533
PCT Pub. Date: Jan. 30, 2020

(65) Prior Publication Data
US 2022/0260855 A1  Aug. 18, 2022

(30) Foreign Application Priority Data

Jul. 25, 2018  (GB) ...................................... 1812138

(51) Int. Cl.
*G02C 7/06* (2006.01)
*G02C 7/02* (2006.01)

(52) U.S. Cl.
CPC ............. *G02C 7/063* (2013.01); *G02C 7/024* (2013.01)

(58) Field of Classification Search
CPC .................................. G02C 7/024; G02C 7/063
USPC ..................................................... 351/159.47
See application file for complete search history.

(56) References Cited

U.S. PATENT DOCUMENTS

| | | |
|---|---|---|
| 5,812,237 A | 9/1998 | Roddy |
| 7,540,610 B2 | 6/2009 | Carimalo et al. |
| 7,744,215 B2 | 6/2010 | Blum et al. |
| 8,579,436 B2 | 11/2013 | Calixte et al. |
| 2005/0270482 A1 | 12/2005 | Fisher et al. |
| 2010/0149492 A1 | 6/2010 | Allione et al. |
| 2011/0037944 A1* | 2/2011 | Varnas .................... G02C 7/063 351/159.42 |
| 2012/0176583 A1 | 7/2012 | Calixte et al. |
| 2015/0049301 A1* | 2/2015 | Krall ...................... G02C 7/065 351/159.42 |

* cited by examiner

*Primary Examiner* — Mustak Choudhury
(74) *Attorney, Agent, or Firm* — FISHERBROYLES, LLP; Roger L. Browdy; James E. Mrose

(57) ABSTRACT

An ophthalmic lens having a front surface and a back surface, wherein at least one of the front and back surfaces is aspherical and said aspherical surface comprises: a neutral region, located substantially in the center of the lens, in which the addition power and the cylinder power are both negligible, and a functional region, located next to the neutral region and in a periphery of at least a lower half of said aspherical surface, in which the addition power and the cylinder power are increasing radially toward the periphery of the lens. Spectacles having such lenses and methods for designing and manufacturing such lenses.

18 Claims, 14 Drawing Sheets

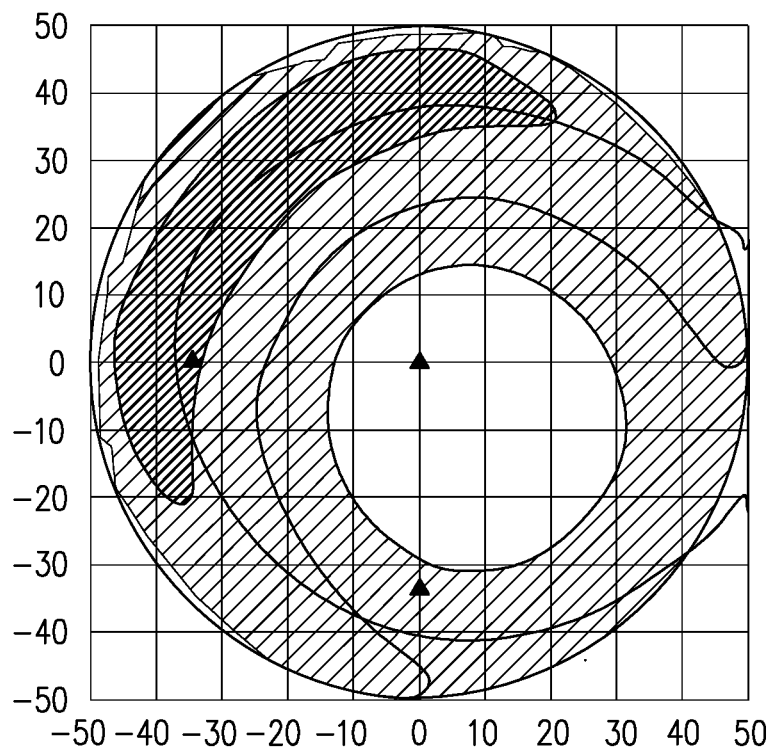
FIG. 2A
PRIOR ART
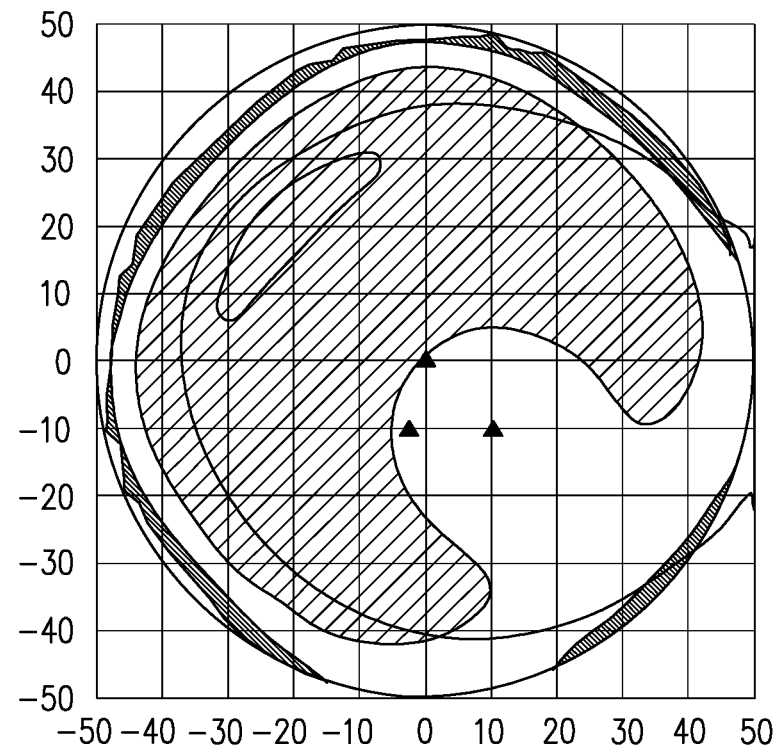

ASPHERICAL OPHTHALMIC LENS

FIELD OF INVENTION

The present invention relates to an ophthalmic lens, more precisely to an aspherical ophthalmic lens with an anti-fatigue effect for accommodation. This ophthalmic lens has the advantage of providing an improved comfort.

BACKGROUND

Focusing on small digital screens, one to three feet away for an extended period of time can cause blurred vision, headaches and discomfort as the eyes internal lens continually accommodates to maintain plus power for focusing at these distances. To date, several anti-fatigue lenses are available for pre-presbyopes to address this problem (see for instance U.S. Pat. No. 7,540,610 or U.S. Pat. No. 8,579,436). Pre-presbyopes have no near vision prescription, i.e. their prescribed sphere power is equal to zero. Products, known as anti-fatigue or "AF" lenses, relieve digitally induced eyestrain and other visual stress by including an optical power "boost" at the bottom of the lens in the form of a positive (for instance +0.60 diopter) additional addition power. As a result, continuous accommodation is reduced through the course of the day and visual fatigue is reduced.

However, the configurations of these prior art solutions often result in high optical aberrations in the central (most used) part of the lens.

One aim of the present invention is to provide an ophthalmic lens having a configuration resulting in an anti-fatigue effect for the eye of a wearer. In addition, the present invention aims at overcoming the existing issue of anti-fatigue lenses such as high optical aberrations in the central region of the anti-fatigue lens of the prior art and to provide an improved comfort to its wearer in comparison with the correction provided by lenses of the prior art.

SUMMARY

The present invention provides a new single vision solution for ophthalmic lenses wearers, for instance non-presbyopic wearers, especially myopic or hyperopic wearers. The effect of the present invention relates mainly to provide a lens with a configuration allowing a relaxed/anti-fatigue effect for the eye of a wearer of the lens, that is to say to provide him with a lens with an anti-fatigue effect when used. This relaxing (or anti-fatigue) accommodation effect is relevant for instance for myopes or hyperopes (i.e. positive asphericity). A lens according to the teaching of the present invention has a more open, larger and wider neutral region without significant optical aberrations. This is obtained by means of reconfiguring the positive asphericity with an addition increasing radially and being stronger in the periphery of the lens. The design of this new single vision aspherical lens has characterizing features which distinguish it from the prior art. Firstly, the lens is characterized by a radially increasing (that is to say positive) addition power from its center to its periphery, in other words, the power addition is minimal (or even equal to zero) in the center and radially increasing in an outward direction. Secondly, the functional region of the lens—the region with addition power—does not have the classical shape of the prior art (i.e. oval or cut-oval). It is longer than the classical shape, and follows the periphery of the lens. Indeed, it can be defined either by an increased ratio of its area to its perimeter, an increased ratio of width to height, or by the specific addition power variation along cross sections between the fitting point and the edge of the lens. Thirdly, the lens has an increased cylinder in its functional region whilst the cylinder remains low or even substantially equal to zero in the central region of the lens. In one embodiment of the lens according to the present invention, the maximal addition power is reached radially and is a function of the prescribed sphere power. Moreover, the lens has an overall reduced unwanted cylinder power (i.e. an un-prescribed cylinder power due to asphericity). By means of this configuration, the optical aberrations in the center of the lens are minimized. In addition, the less complex shapes of the functional and neutral segments (and the softer limit lines of the segments) ensure a more comfortable transition to the wearer of the lens, minimizing the lack of visual comfort of the lens in comparison to prior art.

Embodiments provide ophthalmic lenses, spectacles and method for designing and producing such lenses according to the appended claims.

A first embodiment of the first aspect of the invention is an ophthalmic lens having a front surface and a back surface, wherein at least one of the front and back surfaces is aspherical and said aspherical surface comprises: a neutral region, located substantially in the center of the lens, in which the addition power and the cylinder power are both negligible, and a functional region, located next to the neutral region and in a periphery of at least a lower half of said aspherical surface, in which the addition power and the cylinder power are increasing radially toward the periphery of the lens.

In a second embodiment of the first aspect of the invention, according to the first embodiment, the functional region is also at least partly located on the periphery of the upper half of said aspherical surface.

In a third embodiment of the first aspect of the invention, according to the first or second embodiment, a maximum of addition power is a function of one of the prescribed sphere power for far vision for a wearer of the lens, and the age of a wearer.

In a fourth embodiment of the first aspect of the invention, according to any one of the preceding embodiments, the prescribed sphere power varies in the range of −8 diopter and 0 diopter, preferably −6 and 0, even more preferably −4 and 0 most preferably −2 and 0.

In a fifth embodiment of the first aspect of the invention, according to any one of the preceding embodiments, the lens is a single vision lens.

In a sixth embodiment of the first aspect of the invention, according to any one of the preceding embodiments, the lens is adapted for correcting myopia.

In a seventh embodiment of the first aspect of the invention, according to any one of the preceding embodiments, the addition power and the cylinder power both increase with substantially the same or a similar rate across said aspherical surface to reach a maximum in the periphery of the aspherical surface.

In an eighth embodiment of the first aspect of the invention, according to any one of the preceding embodiments, the addition power between the center and the periphery of the lens on a 45° cross section substantially continuously increases over the entire length of the cross section.

In a ninth embodiment of the first aspect of the invention, according to any one of the preceding embodiments, the cylinder power variation is substantially symmetrical about a cross-section of substantially 90° in the lower half of the lens.

In a tenth embodiment of the first aspect of the invention, according to any one of the preceding embodiments, the ratio between the area and the perimeter of a zone where the power addition is equal or greater than 0.4 diopter is less than 2 (units in sqmm/mm), and the width to height ratio is greater than 2, more preferably greater than 3, most preferably greater than 4.

In an eleventh embodiment of the first aspect of the invention, according to any one of the preceding embodiments, a neutral radius is defined as the shortest distance from the fitting point of the lens to iso-cylinder line of 0.25 D, a maximum radius is defined as the shortest distance from the fitting point of the lens to a maximum cylinder, the neutral radius is greater than 20% of the height of the lens frame (B value), and the maximum radius is greater than 32% of the height of the lens frame (B value).

In a twelfth embodiment of the first aspect of the invention, according to any one of the preceding embodiments, the relationship between the prescribed sphere power and the addition power is included in the range given by the following table (it is to be noted that the values are symmetrical for positive and negative values of prescription), where the addition power is substantially the middle of the acceptable range, and the minimum and maximum addition power in the table define the shape of the acceptable range:

| Prescribed Sphere Power (D) | Addition Power (D) | Min Addition Power (D) | Max Addition Power (D) |
|---|---|---|---|
| <−2.00 | 0.5 | 0.5 | 0.5 |
| −2.00 | 0.48 | 0.4 | 0.5 |
| −1.75 | 0.45 | 0.33 | 0.5 |
| −1.65 | 0.4 | 0.3 | 0.5 |
| −1.5 | 0.38 | 0.25 | 0.5 |
| −1.4 | 0.3 | 0.25 | 0.46 |
| −1 | 0.27 | 0.25 | 0.34 |
| −0.7 | 0.25 | 0.25 | 0.25 |
| −0.5 | 0.25 | 0.25 | 0.25 |
| 0 | 0.25 | 0.25 | 0.25 |

A second aspect of the present invention is a pair of spectacles comprising at least one ophthalmic lens according to any embodiment of the first aspect of the present invention.

A first embodiment of a third aspect of the present invention is method for designing and manufacturing an ophthalmic lens comprising the steps of: providing the lens with an aspherical surface on at least one of its front and back surfaces, wherein the step of providing the lens with said aspherical surface comprises the steps of: providing said aspherical surface with a neutral region, located substantially in the center of the lens, in which the sphere power and the cylinder power are both negligible, and providing said aspherical surface with a functional region, located next to the neutral region and in a periphery of at least a lower half of said aspherical surface, in which the sphere power and the cylinder power are increasing radially toward the periphery of the lens.

In a second embodiment of the third aspect of the invention, according to the first embodiment, the method is adapted for mass production and comprises the steps of: storing in stock predetermined and pre-produced lenses for each prescription, selecting a lens for corresponding to one of the prescription, cutting the selected lens to fit a chosen frame.

In a third embodiment of the third aspect of the invention, according to the first embodiment, the method is adapted for free form production and comprises the steps of: acquiring wearer parameters including prescription; determining lens design parameters adapted to the acquired wearer parameters; working one of the surfaces of a lens to the lens design parameters determined.

In a fourth embodiment of the third aspect of the invention, according to the third embodiment, the method comprises a step of scaling the design of the lens in order to correspond to the size of a chosen spectacle frame, wherein the scaling step comprises the steps of: determining at least one of a horizontal transformation ratio or a vertical transformation ratio for the chosen spectacle frame, applying at least one of the horizontal transformation ratio and the vertical transformation ratio, to the progression of the sphere power and the cylinder power on the horizontal direction or/and on the vertical direction, respectively.

The details of several embodiments are set forth in the accompanying drawings and the description below. Other features will be apparent from the description and drawings, and from the claims.

BRIEF DESCRIPTION OF THE DRAWINGS

FIG. 2A is an example of prior art lens design.

DETAILED DESCRIPTION OF THE EMBODIMENTS

Figure 1A:
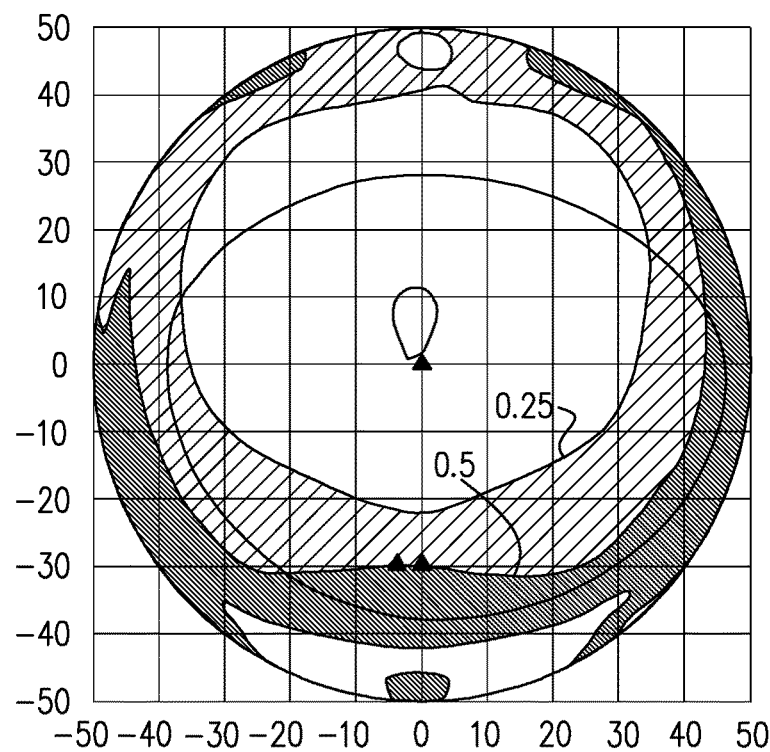
FIG. 1A is a map of addition power over the surface of the lens according to an embodiment of the present invention.

Hereinafter, the embodiments will now be described in detail with reference to the accompanying drawings. However, the disclosure cannot be limited to the embodiment in which the idea of the disclosure is presented, and another embodiment included within range of idea of another backward disclosure or the present disclosure may be easily proposed by addition, change, deletion and the like of another element.

The terms used in this specification were selected to include current, widely-used general terms. In certain cases, a term may be one that was arbitrarily established by the applicant. In such cases, the meaning of the term will be defined in the relevant portion of the detailed description. As such, the terms used in the specification are not to be defined simply by the name of the terms but are to be defined based on the meanings of the terms as well as the overall description of the present disclosure.

An optical prescription is an order written by an eyewear prescriber, such as an ophthalmologist or optometrist. It specifies the values of the optical parameters the prescriber has deemed necessary for the corrective lenses to be provided to a wearer to correct his/her visual impairments. The optical parameters vary but typically include values of sphere or cylinder powers of the lenses, axis, or the pupillary distance. The prescription is typically determined during a refraction, using subjective and objective measurement techniques, or by automated refractor, or through the technique of retinoscopy.

Addition or sphere powers are spherical corrections in diopter of the lens. The term sphere come from the geometry of the lens, due to its curvature. In the present description, a distinction is made between the "sphere" power of the lens which is the prescribed spherical power of the lens for correcting visual impairment, and the "addition" power which is the spherical power for providing the anti-fatigue accommodation to the user when he looks at an object in near distance (near vision).

Cylinder power is the optical effect (astigmatic effect) resulting from the cylindrical or toric form of a lens. An aspherical surface on a lens results in a cylindrical power which may not be wanted (i.e. a cylindrical power which was not prescribed for vision correction).

The profile of a lens is the three-dimensional form of the lens, which provides its optical parameters (sphere power, cylinder power, addition, . . . ). A map is a two-dimensional analysis of the lens optical properties (back and front face) illustrating the results of an analysis for an optical parameter at each point (with two-dimensional coordinates X,Y). However, for simplification, the two terms are used as equivalent in the context of the present description, as the skilled person easily understands it.

A neutral region describes a region or a zone over the surface of the lens, where an optical parameter is negligible (that is to say that the lens map for this parameter shows that the parameter is negligible). In some of the following embodiments, a neutral region is a region where the addition power and/or the unwanted cylinder power is/are negligible.

A functional region describes a region or a zone over the surface of the lens, where an optical parameter is not negligible, that is to say that the lens is adapted so that the optical properties in this region of its surface result in an optical effect. In some of the following embodiments, a functional region is a region where the addition power and/or the cylinder power is/are not negligible. In some cases, a functional region is a region where the maximum value of the addition power and/or the cylindrical power is reached.

Hereinafter, embodiments of the present invention will be described in detail with reference to the accompanying drawings. In some cases, the same embodiment is described and defined with several approaches or parameters.

It is to be noted that the usual parameters of a frame onto which an ophthalmic lens is mounted are well known to the skilled person in the art. However, it is reminded here that frame box A is the horizontal width of the smallest rectangle containing the frame contour. Frame box B is the vertical height of the smallest rectangle containing the frame contour. FH is the height of the fitting box, which is the distance between the fitting point of the lens to the lower point of the lens vertically below the fitting point. In the following description, the exact value provided for the present invention are related to a default frame corresponding to the following parameters: A=50 mm, B=34 mm and FH=20 mm.

It is also to be noted that for the graphical representations of FIGS. 1A to 8C, the density of the shading represents the intensity of the value represented.

The general principle of the present invention is to reconfigure the asphericity of a lens, in other words to adapt the addition power and the cylinder power profiles, in order to provide a smooth and but still substantial addition power to the wearer of the lens. This adaptation is performed on at least one aspherical surface on a side of an ophthalmic lens.

In this context, it is to be noted that it has been discovered during clinical experiments that even if the optical aberrations increase in the functional zone (i.e. at the periphery where the addition power is non-negligible) of the lens, users tend to be less disturbed than when these aberrations are in the center of the lens. Furthermore, it has also been discovered during clinical tests that users simply do not notice an increased lack of comfort during use when the cylinder is maintained below or equal to 0.33 diopters in the functional zone (i.e. in the lower periphery) of the lens. In addition, the near work triad—accommodation, convergence and miosis (regardless of the capacity for accommodation, convergence and miosis)—has still an effect when viewing an object in the near distance, and the sensitivity to optical aberrations and distortions are reduced due to the pinhole effect. Consequently, one feature of the lens according to the present invention is that it has an increased cylinder in its functional region, whilst the cylinder remains low or even substantially equal to zero in the central region of the lens. More precisely, one preferred way of defining the central region of lens is to consider the surface in the center of the lens for which the cylinder is maintained below or equal to 0.24 diopters. In this central region, the cylinder power is considered negligible.

A lens with such an adapted asphericity design can be provided on a pair of spectacles to a wearer.

A specific application of the present improved anti-fatigue accommodation lens, relates to the use of this lens for myopic wearers for which there is an additional advantage. Uncorrected myopic patients are used to clear vision in the short range (i.e. in the near distance): they are short-sighted. Usually, such a visual impairment is corrected by means of a minus or negative prescription, that is to say with the required sphere power to see in the far distance clearly. However, with a lens providing a minus/negative sphere power, the myopic wearers have to accommodate for short distance in order to see clearly, which may lead to unwanted eye strain and fatigue. Myopic wearers—especially those for which the prescription is in the range of 0 to −2 diopters— which are used to see clearly at short distance, may prefer to remove their spectacles with the corrective lens (or to "lift" them) to see at short range, even if they have the capacity to accommodate properly if they keep the spectacles in front of their eyes. Consequently, when reading a book or looking to their mobile phone, such myopic wearers are likely to lift their spectacles. Even patients with a prescription in the ranges of 0 to −4 diopters or 0 to −6 diopters would suffer an added strain, even if they cannot accommodate without the lens. The improved addition profile provided by the present invention provides a comfortable progressive power addition over the surface of the lens used for the near vision (lower half), thus allowing the patient to keep his spectacle on his face and without requiring the wearer to accommodate. In addition, myopic patients are not accustomed to high aberrations in the central zone of their corrective lens and would likely experience discomfort using prior art anti-fatigue type lenses.

Figure 1B:
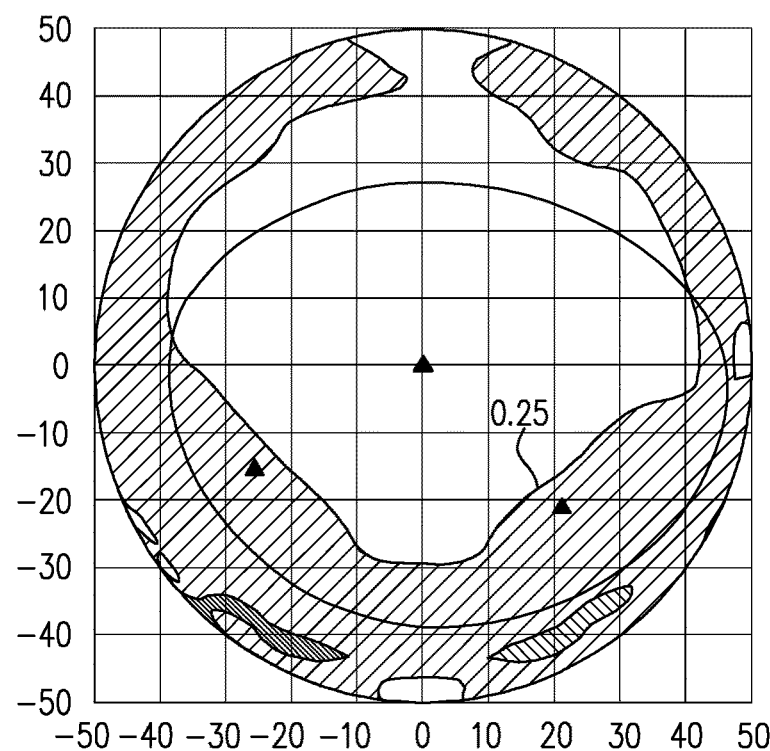
FIG. 1B is a map of cylinder power over the same surface of the lens according to an embodiment of the present invention.

FIGS. 1A and 1B show a lens design (or maps of optical parameters) according to an embodiment of the present invention. For these two figures, and for the following other figures depicting maps of the lens according to one optical parameter, the darker the color is, the high is the value of the optical parameter depicted in the map. FIG. 1A is a map of addition power over the surface of the lens. FIG. 1B is a map of cylinder power over the same surface of the lens. It is to be noted that the present embodiment discloses a lens which has been designed to have a functional zone around substantially its entire periphery. However, it must be clear to the skilled person that a configuration where the functional zone is only on a part of the periphery of the lens would also make use of the present teaching and solve the technical problems addressed by the present invention. For instance, in an embodiment, only the lower half of the surface of the lens has a functional zone (conversely, the upper half). In other words, in such an embodiment only the lower half of the lens would have a periphery in which the addition power and the cylinder power would be non-negligible and increase radially in order to reach their maximum in a region of the periphery of the lens. Other embodiments with more or less than the half of the lens having functional zones are also conceivable.

In FIG. 1A, the map of the addition power is characterized by the fact that the power addition increases radially from the center of the lens, where it is substantially negligible, toward the periphery of the lens. The maximum addition power is reached in a region or in regions substantially in the periphery of the lens. In addition, at the center of the lens, there is a large and wide region where the addition power is negligible.

The same can be said of the map of cylinder power of FIG. 1B. In the center of the lens, there is large and wide zone or region where the cylinder power is negligible. The cylinder power variation is characterized by a radial increase, that is to say that the cylinder power increases from the center region toward the periphery of the lens. The maximum cylinder is reached in a region or regions substantially at the periphery of the lens.

When comparing the map of the addition power of FIG. 1A and the map of cylinder power of FIG. 1B, it can also be noticed that a feature of some embodiments of the present invention is that the addition power and the cylinder power increase from the center of the lens with substantially the same or similar rate. That is to say, that their values do not necessarily increase with the same pace (that is to say of the same amount over the same distance from the center), but the increase in percentage of their respective maximum value has approximately a similar pace. For instance, in an illustrative case where the maximum accommodation power is 1 diopter and the maximum cylinder power is 0.6 diopter, at a radial distance from the center where the addition power has reached half of its maximal value (i.e. 0.5 diopter), the cylinder power will be of approximately half of its maximal value (i.e. 0.3 diopters).

Figure 2B:
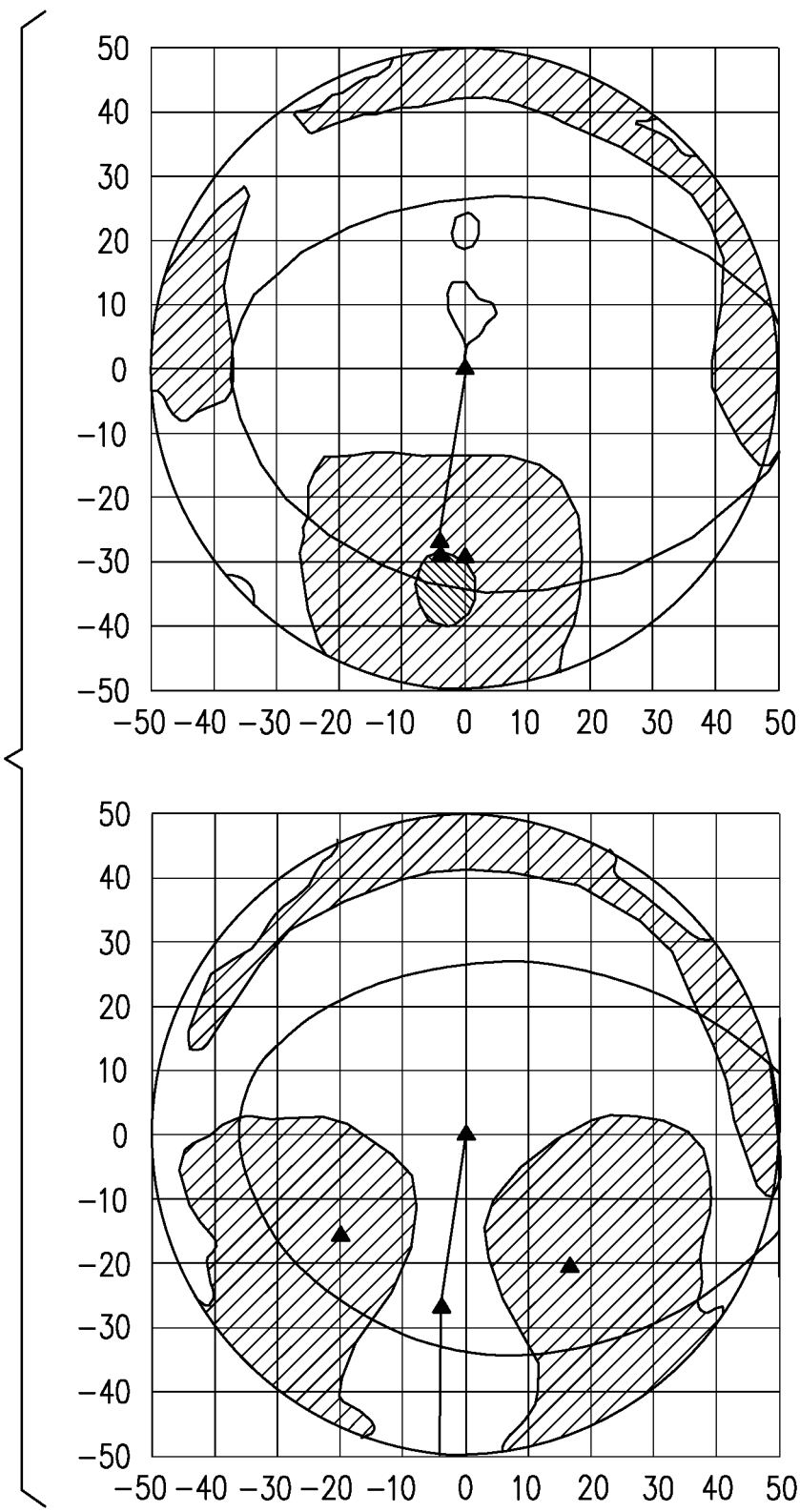
FIG. 2B shows two maps of an anti-fatigue progressive lens according to prior art.
Figure 2C:
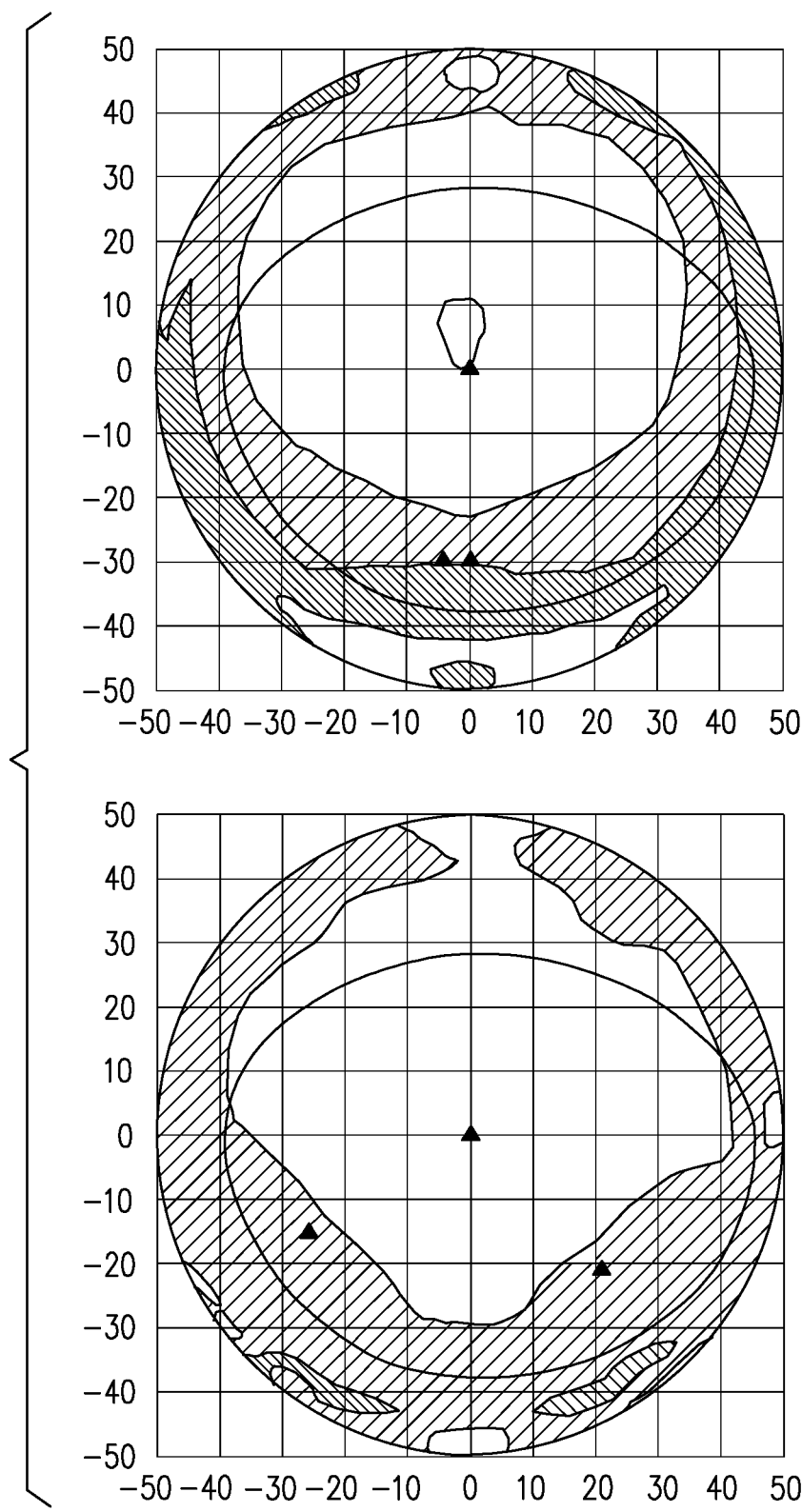
FIG. 2C shows the configuration of the embodiment of the lens according to the present invention presented in FIGS. 1A and 1B.

FIG. 2A is an example of prior art lens design in comparison with FIG. 2C showing the configuration of the embodiment of the lens according to the present invention presented in FIGS. 1A and 1B. The upper graphs are maps of addition power over the surface of these lenses, and the lower graphs are maps of cylinder power over the surface of these lenses.

FIG. 2A is an example of a single vision stock lens. As single vision lens (or SV lens or SV stock lens) relates to a lens designed for non-presbyopic patients, who do not require a different correction for viewing at near distance. Such a single vision lens is a lens with spherical front and back sides, having an oblique astigmatism. This oblique astigmatism can be observed in FIG. 2A for both the addition and cylinder power maps which are substantially symmetrical about a 45° cross section. Several combinations of curvature for the front and back sides can conceivable in order to provide the appropriate prescription, i.e. the required optical correction.

When comparing the maps of FIG. 2A with the maps of FIG. 2C representing the embodiment of the present invention presented in FIGS. 1A and B, it can be confirmed that the features above described are different from the prior art lens. The lens according to the invention has a clear repartition of the neutral and functional regions between the center and the periphery of the lens. The neutral zone is larger and wider, especially the zone where the cylindrical power is negligible is much wider and larger, resulting in a more comfortable lens for non-presbyopic patients. The overall cylindrical power is maintained lower than that of the other three designs.

FIG. 2B shows two maps of an anti-fatigue progressive lens according to prior art, whilst FIG. 2C allows the comparison with an embodiment of the present invention. The upper maps correspond to the addition power, whilst the lower maps correspond to cylinder power.

The anti-fatigue progressive lens is characterized for its addition power by a progression over a line of sight of the eye from a neutral central point in the center of the lens toward a near vision region NV figured in dashed line. The maximum power addition is reached in a central position of the near vision region NV. Conversely, in the embodiment of the present invention the increase of power addition happens radially on more than just the line of sight defined above, and is spread over a larger region of the periphery of the lens. That is to say that the addition power map is more comfortable than the classical near vision zone of the prior art.

The anti-fatigue progressive lens is characterized for its cylinder power by a neutral corridor NC over the same line of sight of an eye when the wearer is covering the line of sight from the far vision region (at the center of the lens) to the near vision region. In the present example, the neutral corridor corresponds to a cylinder power below 0.25 diopters. The neutral corridor NC is very narrow and the cylinder power increases quickly when moving away from the center of the neutral corridor. As a result, a wearer not used to astigmatism finds this lens with such properties very uncomfortable to use. Conversely, in the embodiment of the present invention the neutral zone of cylinder power is wide and large at the center of the lens and continues to be larger and wider when covering the line of sight downwards to the near vision region. Moreover, in the region equivalent to the lower part of near vision region, even if the cylinder power has a greater value than for the lens of prior art, it remains lower than 0.3 diopters, thus avoiding any noticeable discomfort for the wearer.

Figure 3A:
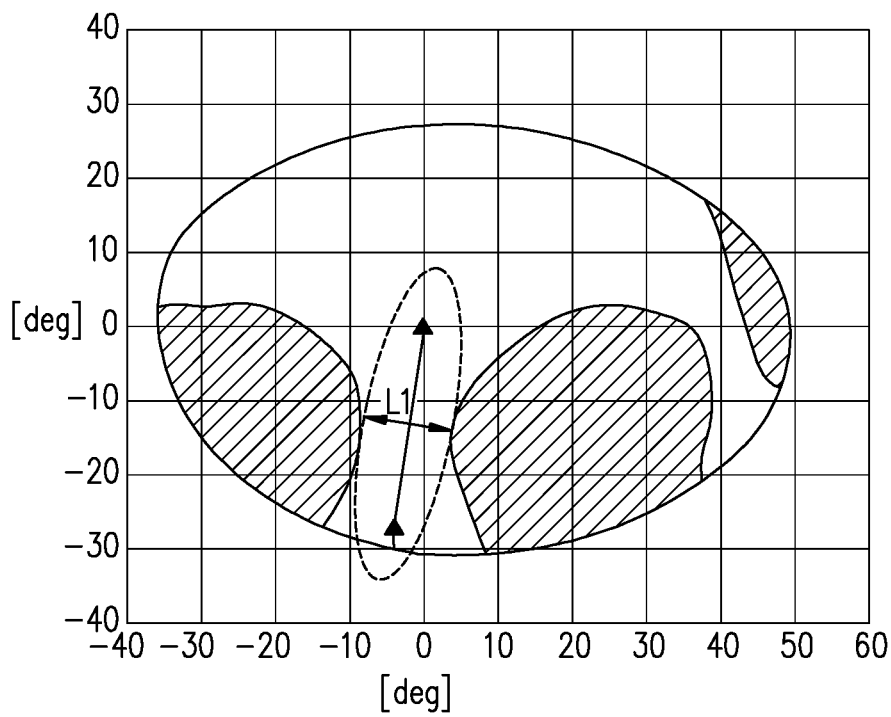
FIGS. 3A and 3B illustrate the cylinder narrow corridor of the anti-fatigue progressive lens in comparison with the large and wide neutral region of the embodiment of the present invention.
Figure 3B:
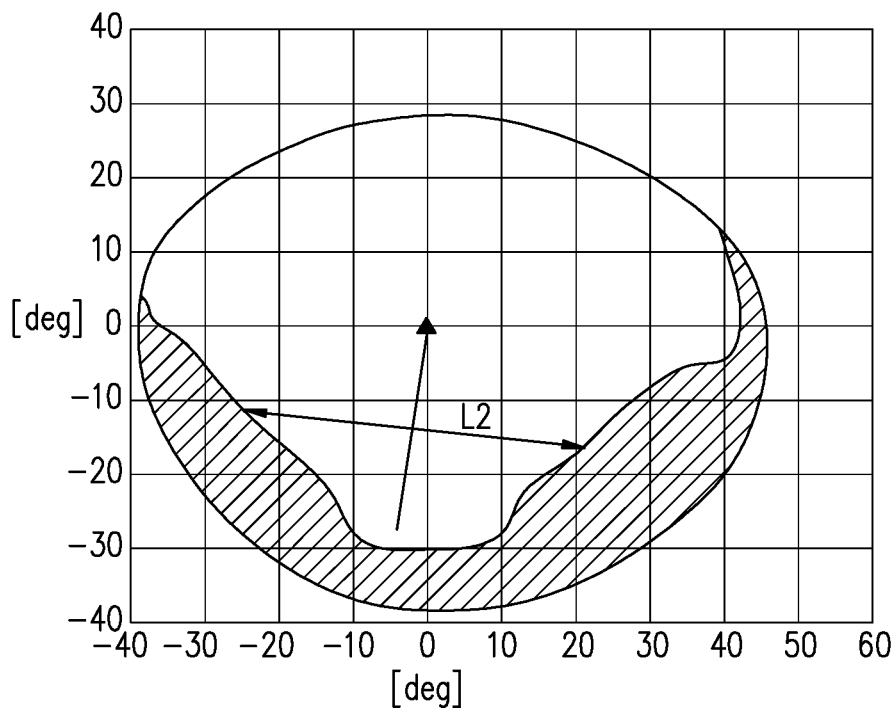

FIGS. 3A and 3B illustrate the cylinder narrow corridor of the anti-fatigue progressive lens in comparison with the large and wide neutral region of the embodiment of the present invention. In FIG. 3A showing the cylinder power map of an anti-fatigue progressive lens, the neutral corridor of cylinder power value below 0.25 diopters is very narrow with a very limited breadth L1. Conversely, the embodiment of the present invention in FIG. 3B has a L2, much broader breadth, thus providing more comfort to users, especially those not used to astigmatism.

Figure 4A:
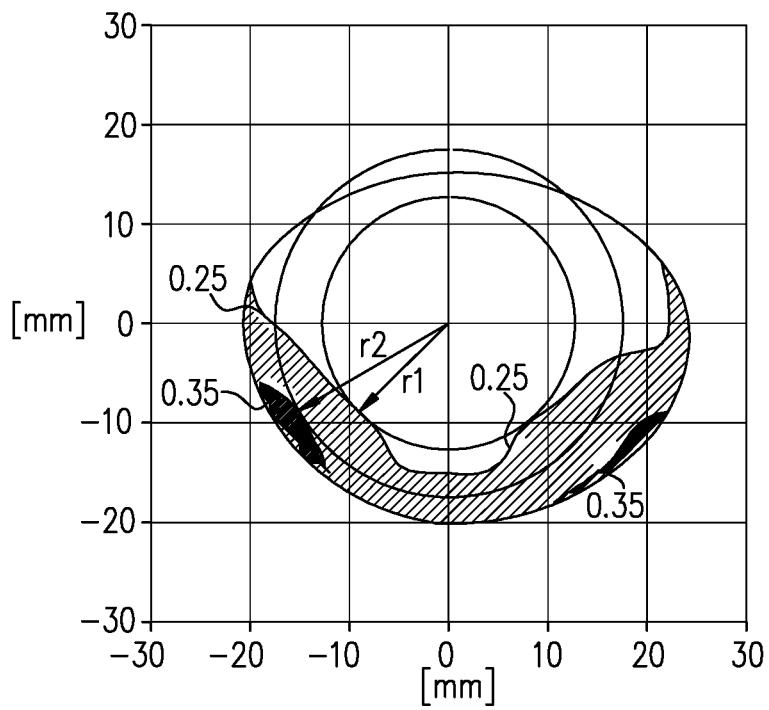
FIGS. 4A and 4B illustrate two measurement radii for an embodiment of the present invention.
Figure 4B:
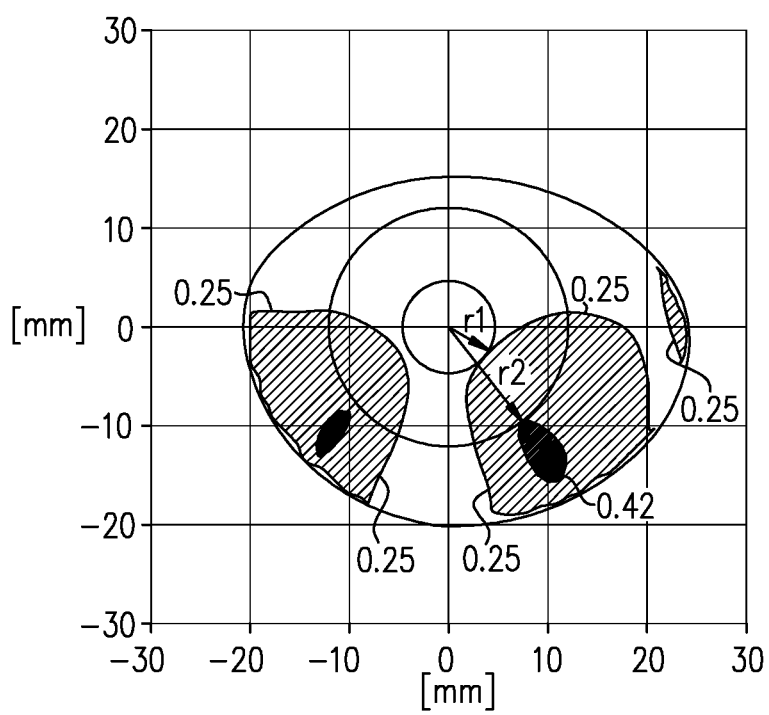

A way of defining parameters for this wider and larger neutral surface versus the narrow corridor is also to define two measurement radii. A first radius r1 is a neutral radius defined as the shortest distance from the fitting point of the lens to iso-cylinder line of 0.25 D, and second radius r2 defined as the shortest distance from the fitting point of the lens to a maximum cylinder as shown in FIGS. 4A and 4B. The following table provides the results for the specific case depicted in FIGS. 4A and 4B.

| Radius | Cylinder measured | Area (where cylinder > 0.25 diopters) |
|---|---|---|
| r1 neutral embodiment of the invention | 12.6 mm (=0.25 D) | 0 |
| r2 maximum embodiment of the invention | 17.6 mm (=0.35 D) | 151 mm$^2$ |
| r1 neutral anti-fatigue progressive | 4.7 mm (=0.25 D) | 0 |
| r1 neutral anti-fatigue progressive | 12.3 mm (=0.42 D) | 144.4 mm$^2$ |

Beyond this specific example and more generally, r1 should be longer than 5 mm, preferably longer than 8 mm, more preferably longer than 10 mm, and most preferably longer than 12 mm. Also, r2 should be longer than 13 mm, preferably longer than 15 mm, more preferably longer than 16 mm, and most preferably longer than 17 mm.

In an even more general way, these values can be expressed in percentage a frame/lens parameter. For instance, selecting the frame box B (as described above, the vertical height of the smallest rectangle containing the frame contour—in the case where the lens has the same shape as of the frame box, B is the vertical height of the smallest rectangle containing the lens contour), r1 should be longer than 20% of B, preferably longer than 25% of B, and most preferably longer than 30% of B. Similarly, r2 should be longer than 32% of B, preferably longer than 37% of B, more preferably longer than 40% of B, and most preferably longer than 42% of B.

Figure 5A:
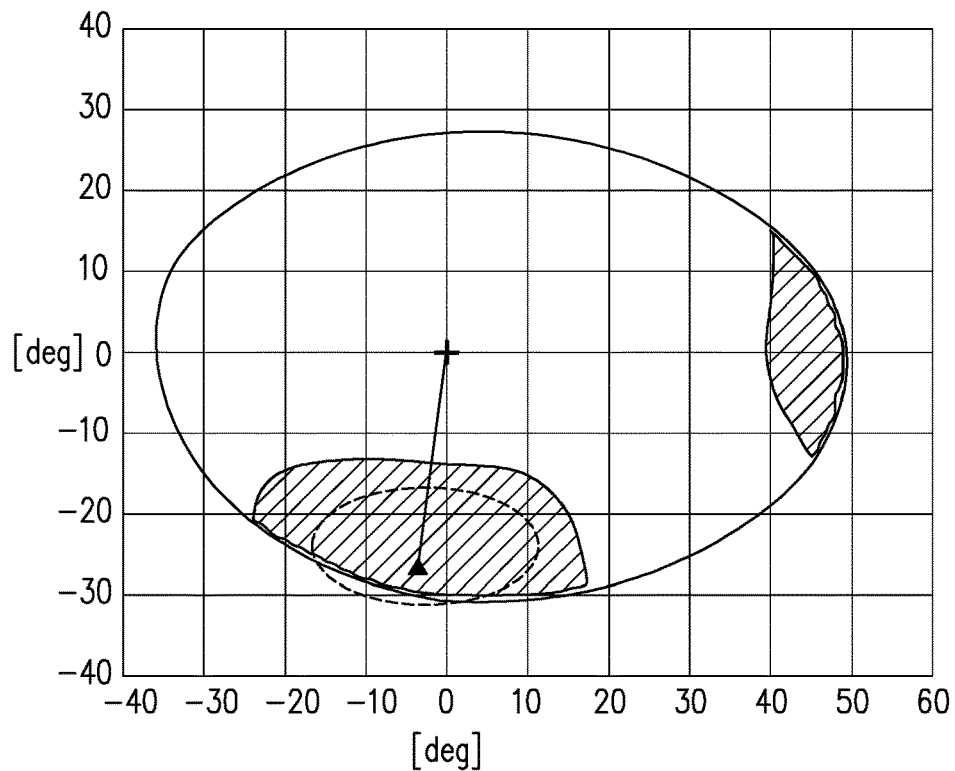
FIGS. 5A and 5B illustrate the difference of addition power in the lower periphery of the lens for an embodiment of the present invention in comparison with the prior art.
Figure 5B:
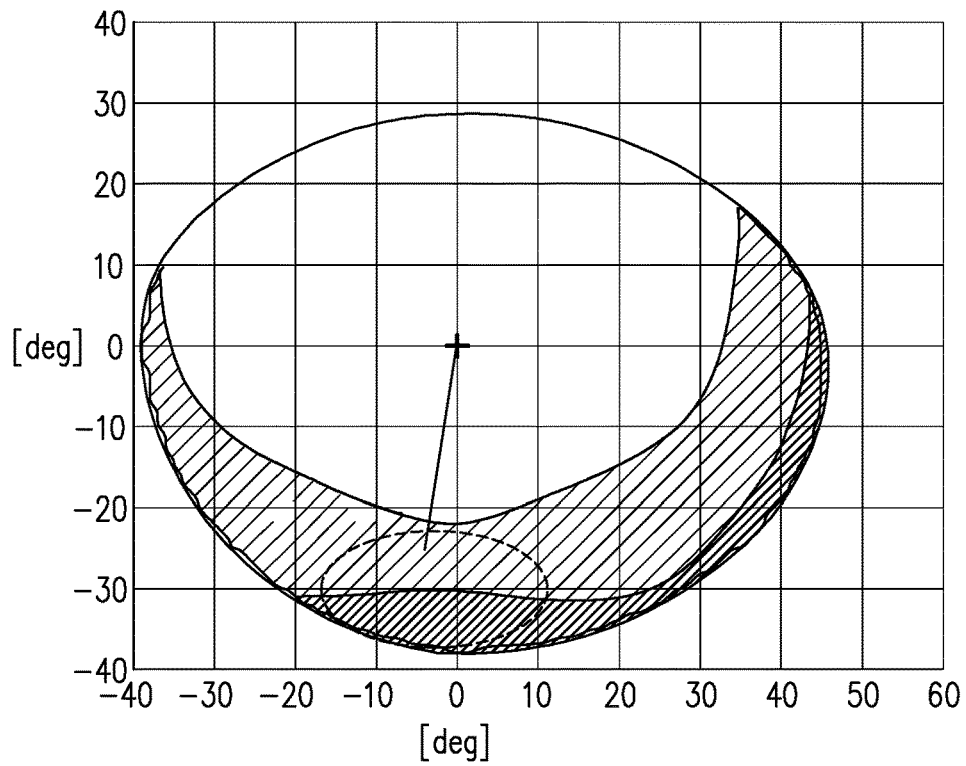
Figure 5C:
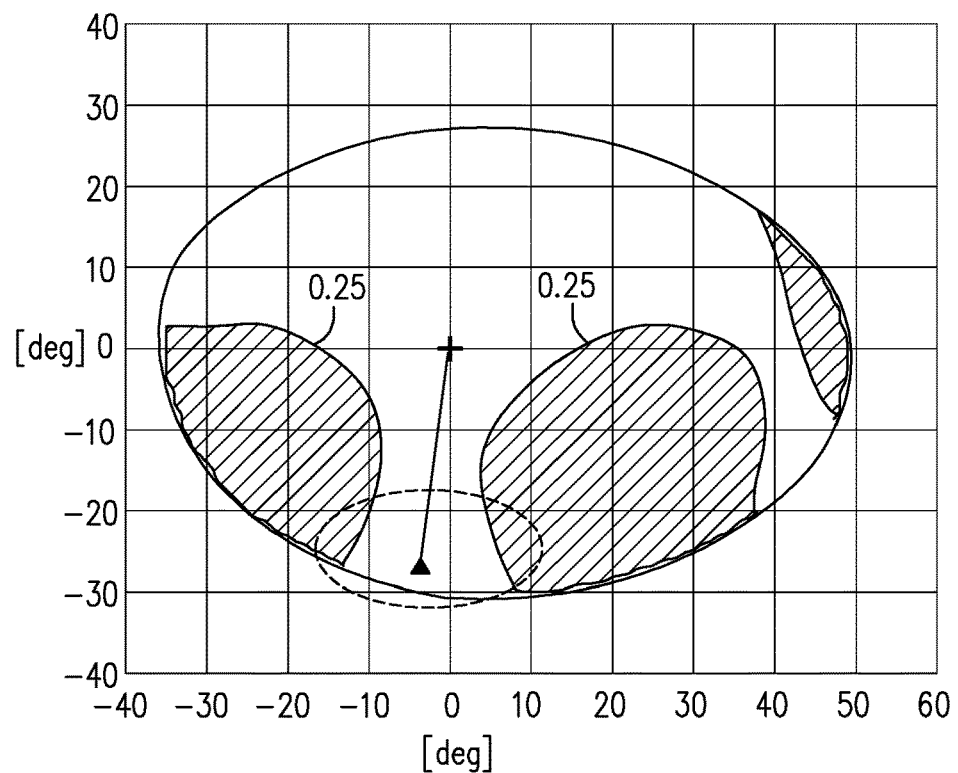
FIGS. 5C and 5D illustrate the difference of cylinder power in the lower periphery of the lens for an embodiment of the present invention in comparison with the prior art.
Figure 5D:
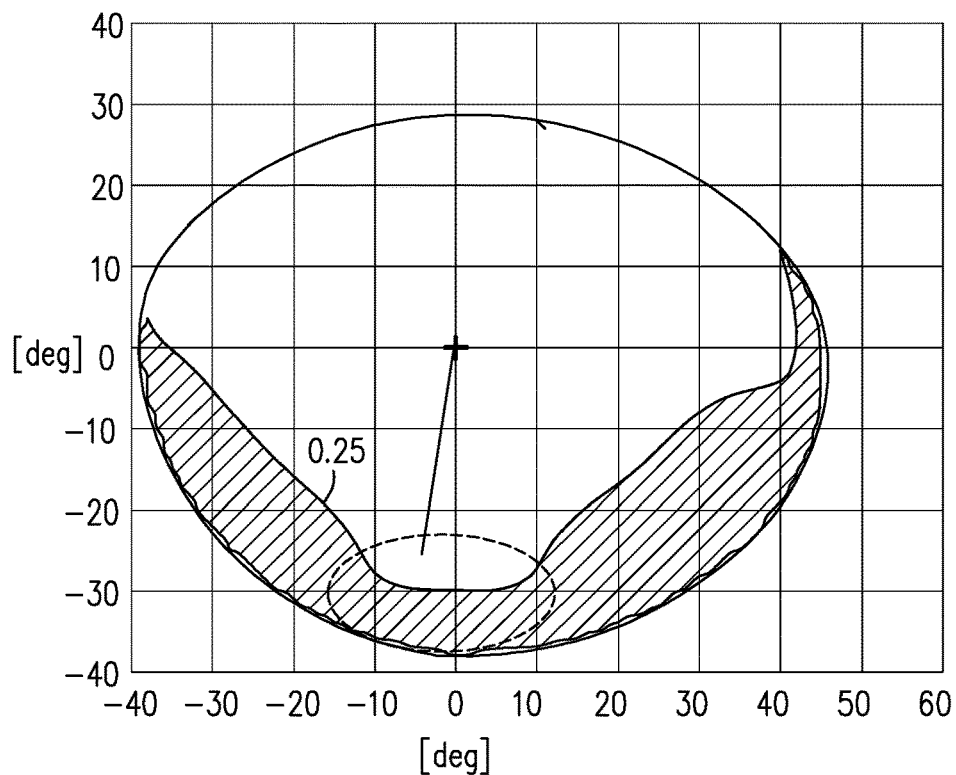

FIGS. 5A and 5B illustrate the difference of addition power in the lower periphery of the lens and FIGS. 5C and 5D illustrate the difference of cylinder power in the lower periphery of the lens.

FIGS. 5A and 5B illustrate the comparison of the addition power map for the anti-fatigue progressive lens (5A-upper map) and for the embodiment of the invention (5B-lower map). As illustrated, the entire lower periphery contains an addition functional zone in the embodiment of the present invention conversely to the prior art. It is to be noted that for the present embodiment—even if it is not necessary for the realization of the teaching of the present invention—in the near vision region, the addition power is also much higher in some areas of the periphery and similar in others. That is to say that in some cases a stronger correction (accommodation) can be obtained.

FIGS. 5C and 5D illustrate the comparison of the cylinder power map for the anti-fatigue progressive lens (5C-upper map) and for the embodiment of the invention (5D-lower map). As illustrated and highlighted by a dashed line, for the lower part of the near vision, the cylinder power in the anti-fatigue progressive lens is below the value 0.25 diopter. Indeed, the zone remains in the neutral corridor. Conversely, in the embodiment of the present invention, the corridor ends and there is a non-negligible cylinder power in a part of the addition power functional area (i.e. the cylinder power value is above 0.25 diopter). However, the value of cylinder power remains below a value which would render it noticeable for a wearer.

Figure 6A:
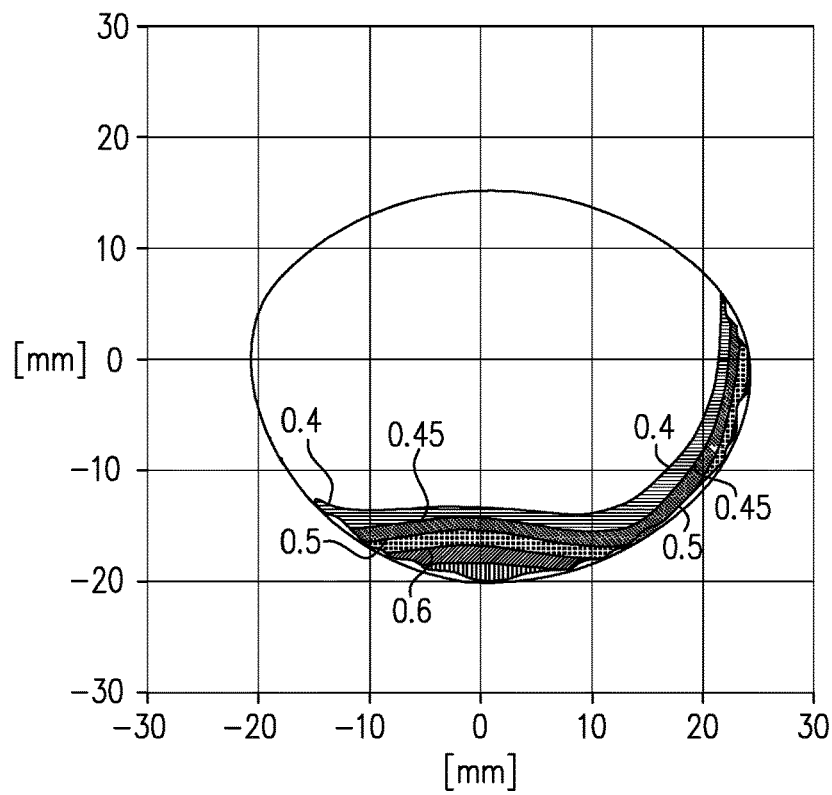
FIGS. 6A, 6B, 6C and 6D illustrate an embodiment similar to the other one, differing in the simple fact that the map is not symmetrical about approximately a center cross section of the lens.
Figure 6B:
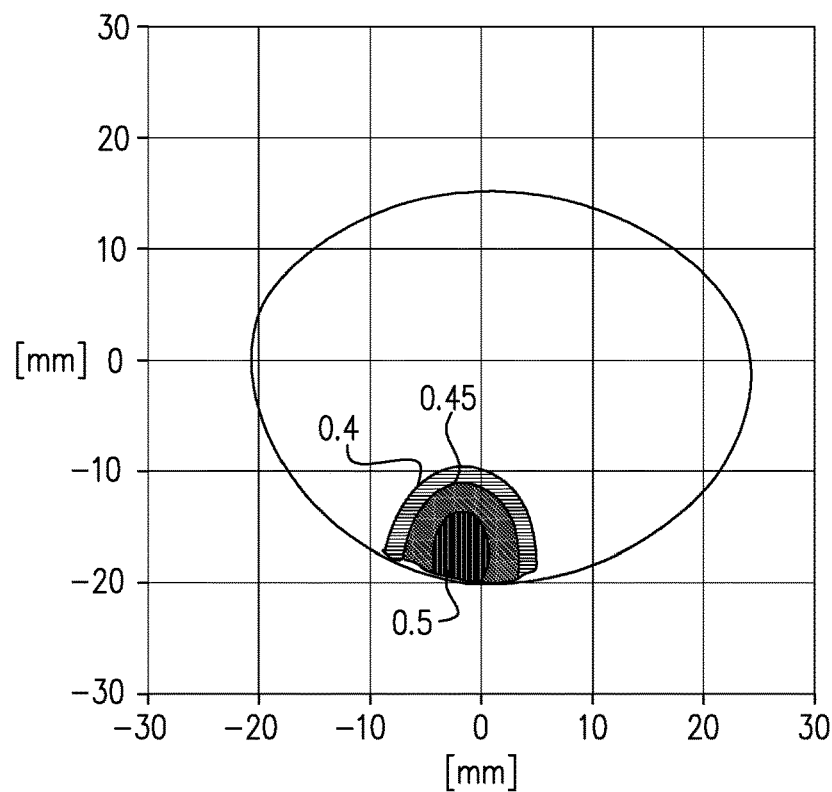

As described above, a specificity of the present invention is the size and the shape of the functional zone of the lens, especially of the functional zone for the addition power. FIGS. 6A and 6B illustrate an embodiment similar to the previous one, differing in the simple fact that the map is not symmetrical about approximately a center cross section of the lens. Only contours of addition greater than 0.4 D are indicated on these maps. When comparing the map for the present invention in FIG. 6A with the map of a lens of prior art such as the anti-fatigue progressive lens of FIG. 6B, it can easily be noticed that the functional area (i.e. the function zones) in the present application is much bigger and spread more vertically over the surface of the lens. A measurable parameter which allows to illustrate the differentiation of the shape and size of the functional zones of the addition map of the present invention with the prior art is the ratio of the area to the perimeter of the functional zones. The following table provides the exact measurements for an embodiment of the present invention and a test lens of prior art.

| Addition Contour Level (Area in mm2, Perimeter in mm) | Anti-fatigue progressive | Embodiment of the invention |
|---|---|---|
| Area of 0.4 D | 35.32 | 64.85 |
| Perimeter of 0.4 D | 39.8 | 110.9 |
| Ratio Area/Perimeter | 0.887437186 | 0.584761046 |
| Area of 0.45 D | 48.14 | 58.85 |
| Perimeter of 0.45 D | 32.6 | 103 |
| Ratio Area/Perimeter | 1.476687117 | 0.571359223 |
| Area of 0.5 D | 27.04 | 46.89 |
| Perimeter of 0.5 D | 19.17 | 97.1 |
| Ratio Area/Perimeter | 1.410537298 | 0.482904222 |

Figure 6C:
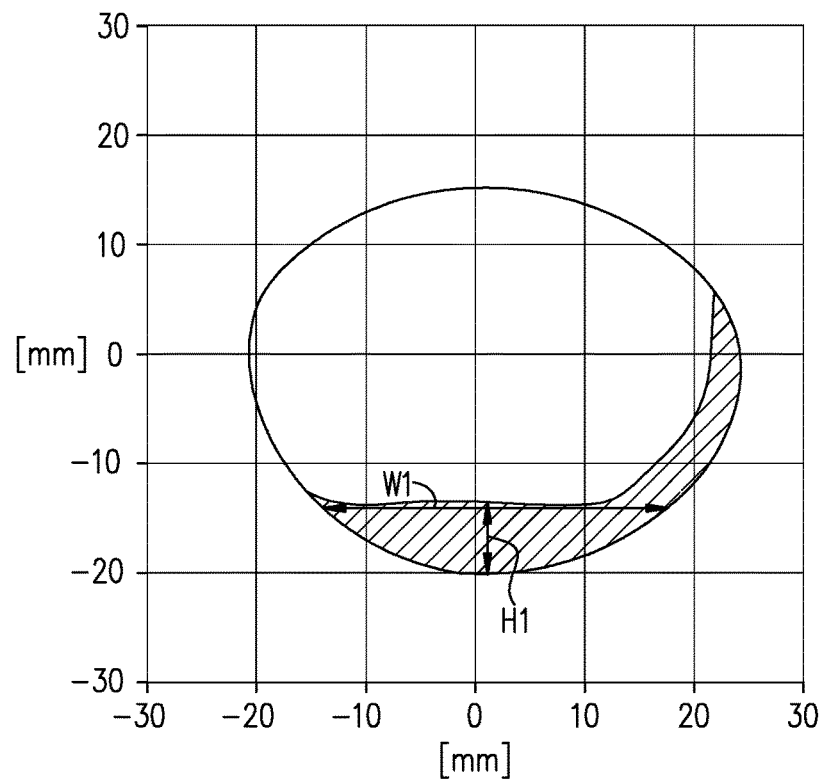
Figure 6D:
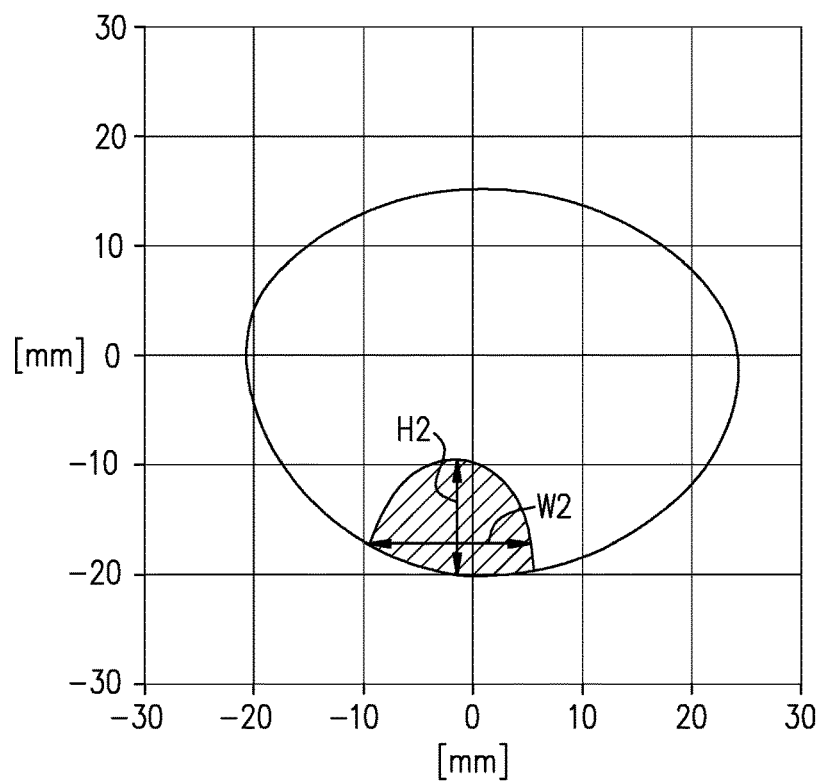

FIGS. 6C and 6D are figures illustrating the width and height of the +0.4 diopter zone of FIGS. 6a and 6B. The width is defined as the longest horizontal line still included in this +0,4 diopter zone or the longest width of the +0.4 diopter zone. The height is the longest vertical line included in the +0.4 diopter zone which intersects the said width line. The ratio between the width and the height of the zone where the power addition is equal or greater than 0.4 diopter (said +0.4 diopter zone) is greater than 2, more preferably greater than 3, most preferably greater than 4.

Another way of providing the parameters to design and describe the lens of the present invention is to present the variations of addition power and cylinder power along a radial cross section of the lens. For instance, for a radial cross section at 45°. With reference to FIGS. 7A, 7B, 7C, 8A, 8B and 8C where an angle θ is equal to 45°.

Figure 7A:
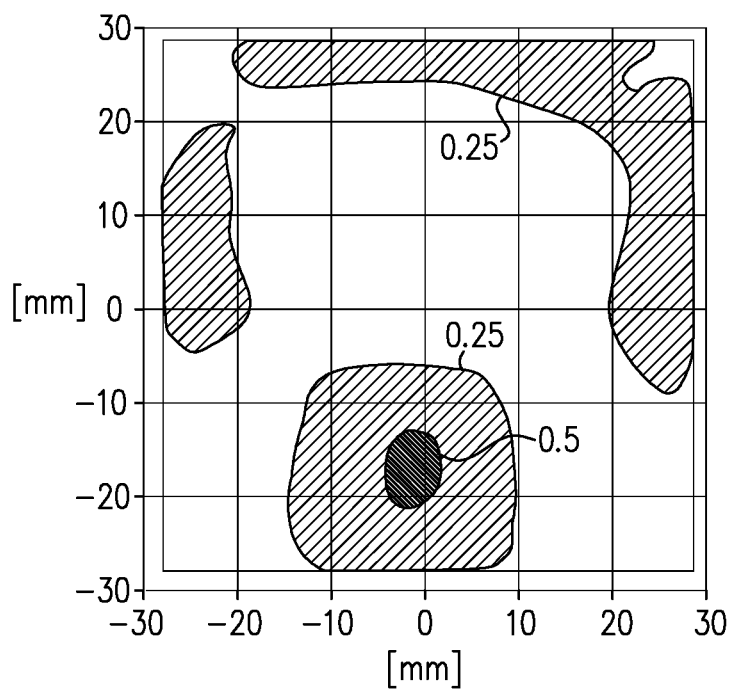
FIG. 7A illustrates the physical localization of a 45° cross section on a flattened addition power map according to an anti-fatigue progressive lens of the prior art.
Figure 7B:
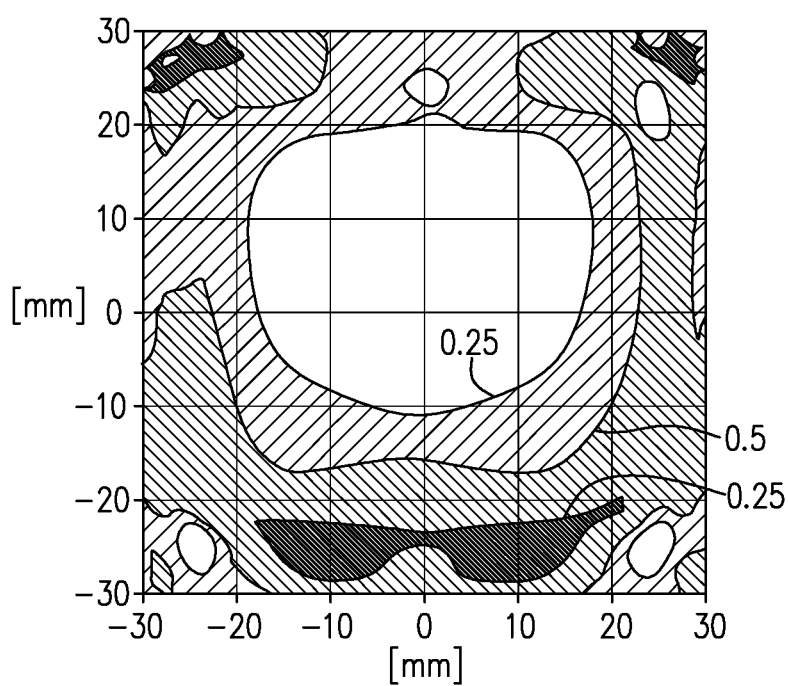
FIG. 7B does the same for a lens according to an embodiment of the present invention.
Figure 7C:
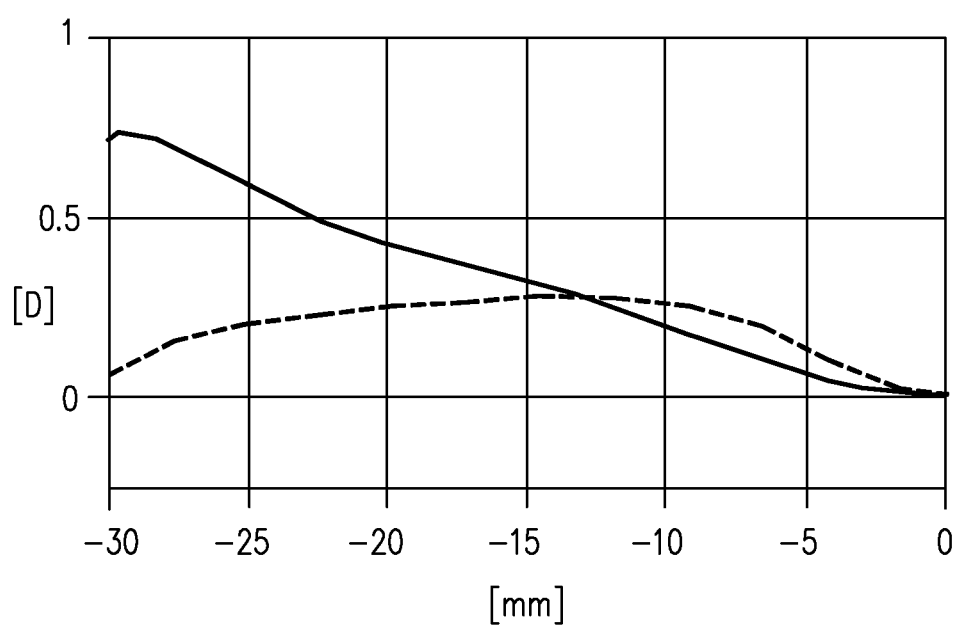
FIG. 7C describes the variation of addition power over this 45° cross section.

FIG. 7A illustrates the physical localization of a 45° cross section on a flattened addition power map according to an anti-fatigue progressive lens of the prior art. FIG. 7B does the same for a lens according to an embodiment of the present invention. FIG. 7C describes the variation of addition power over this 45° cross section: the dashed line is the variation for the prior art anti-fatigue progressive lens and the full line is the variation for the embodiment of the present invention. The addition power of the present invention increases over the entire radial distance to the periphery. That is to say that the addition power between the center and the periphery of the lens on this cross section substantially continuously increases over the entire length of the cross section. The addition increases from substantially zero at the fitting point to over 0.4 D at a horizontal distance of 20 mm from the fitting point along the cross section. It is to be noted that the addition power map is also in some embodiments symmetrical about a cross section of substantially 90°.

Figure 8A:
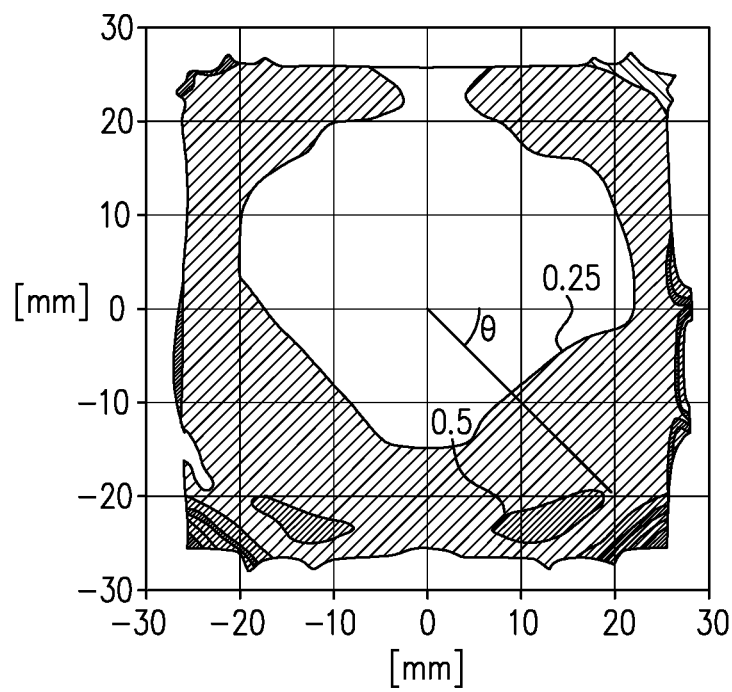
FIG. 8A illustrates the physical localization of a 45° cross section on a residual cylinder power map according to an embodiment of the present invention.
Figure 8B:
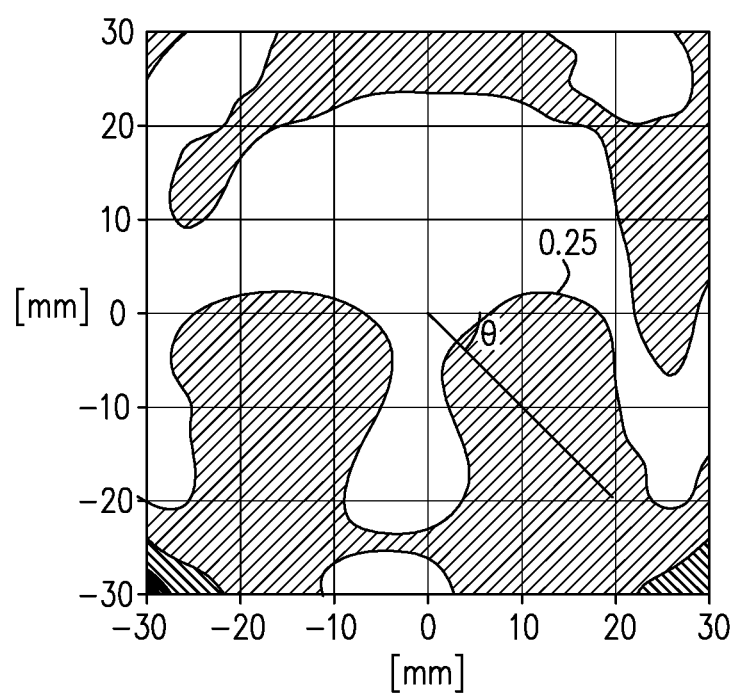
FIG. 8B illustrates the physical localization of a 45° cross section on a resuidual cylinder power map according to an anti-fatigue progressive lens of the prior art.
Figure 8C:
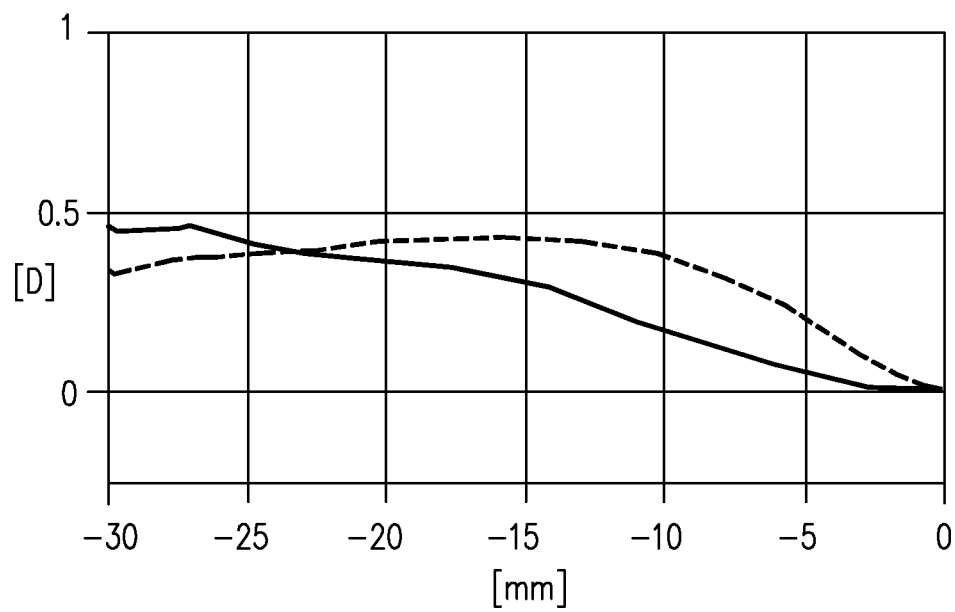
FIG. 8C describes the variation of cylinder power over this 45° cross section.

FIG. 8B illustrates the physical localization of a radial 45° cross section on a residual cylinder power map according to an anti-fatigue progressive lens of the prior art. FIG. 8A does the same for a lens according to an embodiment of the present invention. FIG. 8C describes the variation of cylinder power over this 45° cross section: the dashed line is the variation for the prior art anti-fatigue progressive lens and the full line is the variation for the embodiment of the present invention. The cylinder power increases much slower in the embodiment of the present invention, allowing to have a wider and greater neutral zone, providing a comfortable solution for a user, especially if not accustomed to astigmatism. It is to be noted that this greater and wider neutral cylinder zone is obtained despite the fact that the lens according to the embodiment of the present invention provides a stronger addition power. The cylinder power should vary on a 45° cross section between the center of the lens and a point at 10 mm of it in the range of 0 diopter and 0.4 diopters, preferably 0 and 0,3 diopters, most preferably 0 and 0,25 diopters. It is to be noted that the cylinder power map is also in some embodiments symmetrical about a cross section of substantially 90°.

Figure 9:
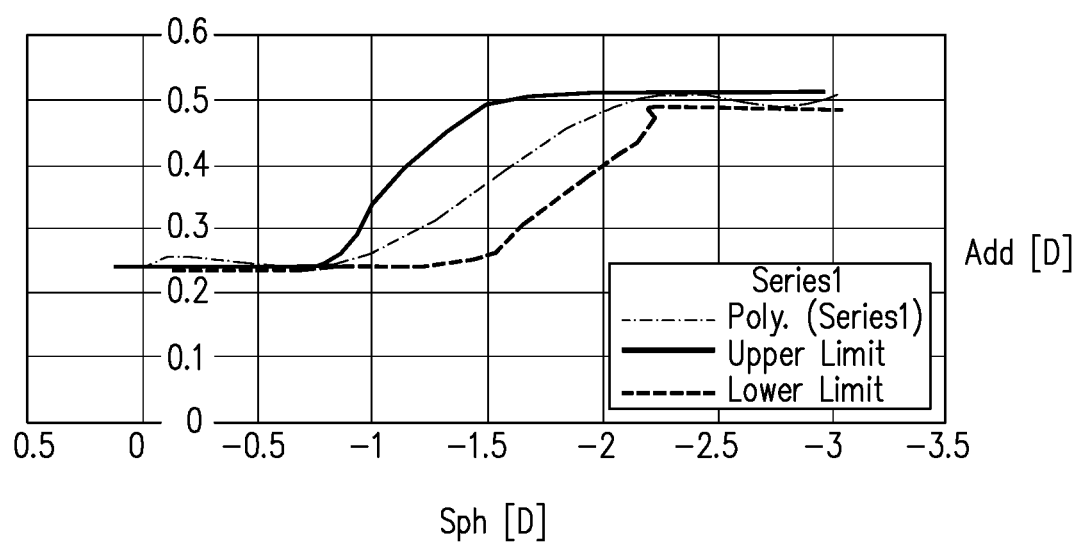
FIG. 9 illustrate the relationship between the prescribed sphere power and the addition power according to an embodiment of the present application.

In one embodiment of the present invention, the addition power (i.e. the difference between the prescribed power for far vision correction and the maximum power in the functional region), can be correlated with the patient requested (or prescribed) sphere correction for far vision, and not be a default/pre-defined value. FIG. 9 shows a graph representing the upper and lower limits of the relationship between the prescribed sphere and the addition power.

Here are further described design and production methods for a lens according to the present invention.

Such methods for designing and manufacturing an ophthalmic lens may comprise a step of providing a lens with an aspherical surface on at least one of its front and back surfaces. This step may comprise, the step of providing this aspherical surface with a neutral region, located substantially in the center of the lens, in which the sphere power and the cylinder power are both negligible, and the step of providing this aspherical surface with a functional region, located next to the neutral region and in a periphery of at least a lower half of said aspherical surface, in which the sphere power and the cylinder power are increasing radially toward the periphery of the lens. It is to be noted again, that this step may also be performed on substantially the entirety of the periphery of the lens, or on some parts or more or less than the half of the periphery of the lens. Such lens would also make use of the present teaching.

The design and production method may be performed on stock lenses for mass production or in a bespoke way for providing made-to-measures lenses, specifically adapted to a user or the spectacle frame he or she chooses.

For instance, the method for designing and manufacturing the ophthalmic lens in a case of mass production may comprise the steps of storing in stock predetermined and pre-produced lenses for each prescription, the steps of selecting a lens corresponding to one of the prescription, and the step of cutting the selected lens to fit a chosen frame.

Otherwise, the method for designing and manufacturing the ophthalmic lens in a case of free form production (i.e. bespoke) may comprise the steps of acquiring wearer parameters including prescription, the step of determining lens design parameters adapted to the acquired wearer parameters, and the step of working one of the surfaces of a lens to the lens design parameters determined.

In the bespoke case, a scaling step may be performed to scale the optical parameter map of the lens to a specific shape of frame chosen be the user. In this way, the optical features of the designed lens do not risk being cut out of the final lens which will be assembled with the spectacle frame. This scaling step may comprise the step of determining at least one of a horizontal transformation ratio or a vertical transformation ratio for the chosen spectacle frame, the step of applying at least one of the horizontal transformation ratio and the vertical transformation ratio, to the progression of the sphere power and the cylinder power on the horizontal direction or/and on the vertical direction, respectively.

The invention claimed is:

1. An ophthalmic lens for spectacles having a front surface and a back surface and optical parameters including addition power, cylinder power and a prescribed sphere power, wherein at least one of the front and back surfaces is aspherical, wherein: said aspherical surface comprises:
    a neutral region, located substantially in the center of the lens and in an upper region, located in a periphery of an upper half of said aspherical surface, in which the addition power and the cylinder power are below or equal to 0.25D, thus both the addition power and the cylindrical power being negligible, and
    a functional region, located next to the neutral region and in a periphery of a lower half of said aspherical surface, in which the addition power and the cylinder power are increasing radially at least within the functional region toward the periphery of the lens, and
    said aspherical surface is characterized by at least one of the following: (a) the ratio between the width and the height of a zone where the addition power is equal or greater than 0.4 diopter is greater than 2; and (b) the ratio between the area in sqmm and a perimeter in mm of the zone where the addition power is equal or greater than 0.4 diopter is greater than 0.6.

2. The ophthalmic lens according to claim 1, wherein the prescribed sphere power varies in the range of −8 diopter and 0 diopter.

3. The ophthalmic lens according to claim 1, wherein the addition power in the functional region is in the range of 0.25 diopter to 0.5 diopter.

4. The ophthalmic lens according to claim 1, wherein the addition power and the cylinder power both increase with substantially the same rate across said aspherical surface to reach a maximum in the periphery of the aspherical surface.

5. The ophthalmic lens according to claim 1, wherein the addition power between the center and the periphery of the lens on a 45° cross section substantially continuously increases over the entire length of the cross section.

6. The ophthalmic lens according to claim 1, wherein the cylinder power variation is substantially symmetrical about a cross-section of substantially 90° in the lower half of the lens.

7. An ophthalmic lens according to claim 1, wherein a neutral radius is defined as the shortest distance from a fitting point of the lens to iso-cylinder line of 0.25 D, a maximum radius is defined as the shortest distance from the fitting point of the lens to a maximum cylinder, a value B of a frame box is defined as the vertical height of the smallest rectangle containing the lens contour, wherein the neutral radius is greater than 20% of the height of the B value of the lens and the maximum radius is greater than 32% of the height of the B value of the lens.

8. Spectacles comprising at least one ophthalmic lens, according to claim 1.

9. The ophthalmic lens according to claim 1, wherein the neutral region has a neutral radius being longer than 10 mm.

10. A method for designing and manufacturing an ophthalmic lens for spectacles comprising the steps of: providing the lens with an aspherical surface on at least one of its front and back surfaces, and optical parameters including addition power, cylinder power and a prescribed sphere power, wherein the step of providing the lens with said aspherical surface comprises the steps of: providing said aspherical surface with a neutral region, located substantially in the center of the lens and in an upper region, located in a periphery of an upper half of said aspherical surface, in which the addition power and the cylinder power are below or equal to 0.25D, thus both the addition power and the cylindrical power being negligible, providing said aspherical surface with a functional region, located next to the neutral region and in a periphery of a lower half of said aspherical surface, said functional region being configured such that the addition power and the cylinder power are increasing radially at least within the functional region toward the periphery of the lens, acquiring wearer parameters including prescription, determining lens design parameters adapted to the acquired wearer parameters, and working one of the surfaces of a lens to the lens design parameters determined, scaling the design of the lens in order to correspond to the size of a chosen spectacle frame, wherein the scaling comprises: determining at least one of a horizontal transformation ratio or a vertical transformation ratio for the chosen spectacle frame, applying at least one of the horizontal transformation ratio and the vertical transformation ratio, to the progression of the sphere power and the cylinder power on the horizontal direction or/and on the vertical direction, respectively.

11. The method for designing and manufacturing an ophthalmic lens according to claim 10, wherein the method is adapted for mass production and comprises the steps of:
storing in stock predetermined and pre-produced lenses for each prescription,
selecting a lens for corresponding to one of the prescriptions, cutting the selected lens to fit a chosen frame.

12. The method for designing and manufacturing an ophthalmic lens according to claim 10, wherein the neutral region has a neutral radius being longer than 10 mm.

13. The method for designing and manufacturing an ophthalmic lens according to claim 11, wherein the addition power in the functional region is in the range of 0.25 diopter to 0.5 diopter.

14. An ophthalmic lens for spectacles having a front surface and a back surface and optical parameters including addition power, cylinder power and a prescribed sphere power, wherein at least one of the front and back surfaces is aspherical and said aspherical surface comprises:
a neutral region, located substantially in the center of the lens, in which the addition power and the cylinder power are both negligible,
a functional region, located next to the neutral region and in a periphery of a lower half of said aspherical surface, in which the addition power and the cylinder power are increasing radially at least within the functional region toward the periphery of the lens, and
an upper region, located in a periphery of an upper half of said aspherical surface, in which the addition power and the cylinder power are both negligible;
wherein said aspherical surface is characterized by at least one of the following: (i) a ratio between the width and the height of a zone where the addition power is equal or greater than 0.4 diopter is greater than 2; and (ii) a ratio between the area in sqmm and a perimeter in mm of the zone where the addition power is equal or greater than 0.4 diopter is greater than 0.6.

15. An ophthalmic lens for spectacles having a front surface and a back surface and optical parameters including addition power, cylinder power and a prescribed sphere power, wherein at least one of the front and back surfaces is aspherical and said aspherical surface comprises:
a neutral region, located substantially in the center of the lens, in which the addition power and the cylinder power are both negligible,
a functional region, located next to the neutral region and in a periphery of a lower half of said aspherical surface, in which the addition power and the cylinder power are increasing radially at least within the functional region toward the periphery of the lens, and
an upper region, located in a periphery of an upper half of said aspherical surface, in which the addition power and the cylinder power are both negligible;
wherein the neutral region has a neutral radius characterized by at least one of the following: (a) the neural radius is longer than 10 mm; and (b) the neutral radius is defined as the shortest distance from a fitting point of the lens to iso-cylinder line of 0.25 D, a maximum radius is defined as the shortest distance from the fitting point of the lens to a maximum cylinder, a value B of a frame box is defined as the vertical height of the smallest rectangle containing the lens contour, wherein the neutral radius is greater than 20% of the height of the B value of the lens and the maximum radius is greater than 32% of the height of the B value of the lens.

16. An ophthalmic lens according to claim 15, wherein the addition power and the cylinder power in the neutral region and the upper region are below or equal to 0.25D.

17. A method for designing and manufacturing an ophthalmic lens for spectacles comprising the steps of:
providing the lens with an aspherical surface on at least one of its front and back surfaces, and optical parameters including addition power, cylinder power and a prescribed sphere power wherein the step of providing the lens with said aspherical surface comprises the steps of:
providing said aspherical surface with a neutral region having a neutral radius being longer than 10 mm, located substantially in the center of the lens, in which the sphere power and the cylinder power are both negligible,
providing said aspherical surface with a functional region, located next to the neutral region and in a periphery of a lower half of said aspherical surface, said functional region being configured such that the addition power and the cylinder power are increasing radially at least within the functional region toward the periphery of the lens, and providing said aspherical surface with an upper region, located in a periphery of an upper half of said aspherical surface, in which the addition power and the cylinder power are both negligible.

18. The method for designing and manufacturing an ophthalmic lens according to claim 17, wherein the addition power and the cylinder power in the neutral region and the upper region are below or equal to 0.25D.

* * * * *